(12) United States Patent
Goto

(10) Patent No.: US 10,476,386 B2
(45) Date of Patent: Nov. 12, 2019

(54) DIGITALLY CONTROLLED POWER SUPPLY APPARATUS AND PRODUCTION MANAGEMENT SYSTEM

(71) Applicant: FANUC CORPORATION, Yamanashi (JP)

(72) Inventor: Kazuya Goto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 195 days.

(21) Appl. No.: 15/480,371

(22) Filed: Apr. 6, 2017

(65) Prior Publication Data

US 2017/0302171 A1     Oct. 19, 2017

(30) Foreign Application Priority Data

Apr. 15, 2016 (JP) ................................. 2016-082318

(51) Int. Cl.
| | |
|---|---|
| *H02M 3/156* | (2006.01) |
| *G05B 15/02* | (2006.01) |
| *H02M 3/157* | (2006.01) |

(52) U.S. Cl.
CPC ............ *H02M 3/156* (2013.01); *G05B 15/02* (2013.01); *H02M 3/157* (2013.01); *Y02P 90/86* (2015.11)

(58) Field of Classification Search
None
See application file for complete search history.

(56) References Cited

U.S. PATENT DOCUMENTS 5,691,896 A * 11/1997 Zou .................... G05B 11/42
                                                      700/37
6,510,353 B1 * 1/2003 Gudaz ................ G05B 19/0428
                                                      700/37

(Continued)

FOREIGN PATENT DOCUMENTS

| CN | 1192813 A | 9/1998 |
|---|---|---|
| CN | 1371490 A | 9/2002 |

(Continued)

OTHER PUBLICATIONS

Balogh 'A Practical Introduction to Digital Power Supply Control', Texas Instruments Incorporated (2005).*

(Continued)

*Primary Examiner* — Bernard G Lindsay
(74) *Attorney, Agent, or Firm* — Hauptman Ham, LLP

(57) ABSTRACT

A digitally controlled power supply apparatus includes: a switching device converting an input voltage to output a converted voltage based on gate signals that it has received; a smoothing circuit smoothing the converted voltage to output a power supply voltage; an AD converter AD converting the power supply voltage from the smoothing circuit to output a power supply voltage digital data; a PID controller performing PID control operation to an error between a setpoint and the power supply voltage digital data; a switching drive circuit generating gate signals, based on an operation outcome of the PID controller; a control parameter adjuster dynamically performing automatic adjustment of control parameters of the PID controller, based on a history of fluctuations indicated in samplings of the power supply voltage digital data; and a control parameter output unit outputting the control parameters of the PID controller.

5 Claims, 11 Drawing Sheets

(56) References Cited

U.S. PATENT DOCUMENTS

| | | | | |
|---|---|---|---|---|
| 2006/0020423 A1* | 1/2006 | Sharpe, Jr. | ............ | C10G 11/187 702/183 |
| 2015/0280590 A1* | 10/2015 | Maede | .................. | H02M 3/157 363/21.06 |
| 2016/0261186 A1 | 9/2016 | Jiang et al. | | |
| 2017/0302171 A1* | 10/2017 | Goto | ...................... | G05B 15/02 |

FOREIGN PATENT DOCUMENTS

| | | |
|---|---|---|
| CN | 104303113 A | 1/2015 |
| JP | 2-145977 A | 6/1990 |
| JP | 5-56629 A | 3/1993 |
| JP | H7-295604 A | 11/1995 |
| JP | 11-510932 A | 9/1999 |
| JP | 2003-504750 A | 2/2003 |
| JP | 2005-172653 A | 6/2005 |
| JP | 2010-284055 A | 12/2010 |
| WO | 2013/171875 A1 | 11/2013 |
| WO | 2016/043262 A1 | 3/2016 |

OTHER PUBLICATIONS

Jaeger and Blalock 'Microelectronic Circuit Design' Fourth Edition (2011) p. 163.*

* cited by examiner

DIGITALLY CONTROLLED POWER SUPPLY APPARATUS AND PRODUCTION MANAGEMENT SYSTEM

RELATED APPLICATIONS

The present application claims priority to Japanese Patent Application No. 2016-082318 filed Apr. 15, 2016, the disclosures of which is hereby incorporated by reference herein in its entirety.

BACKGROUND OF THE INVENTION

1. Field of the Invention

The present invention relates to digitally controlled power supply apparatuses and production management systems equipped therewith, and in particular, a digitally controlled power supply apparatus having an automatic adjustment function of control parameters and a production management system equipped therewith.

2. Description of the Related Art

FIG. 12 illustrates a digitally controlled power supply apparatus having a common automatic adjustment function. Generally speaking, a digitally controlled power supply apparatus 501 having an automatic adjustment function for stable DC voltage output includes a switching device 511, a smoothing circuit 512, an analog-digital converter 513, a switching drive circuit 515, and a digital control unit 531. The switching device 511 is, for example, an FET (Field Effect Transistor) and, by being on/off driven in accordance with gate signals that it receives, converts a given input voltage $V_{in}$ to output, for example, a pulse width modulated voltage. The smoothing circuit 512 is for smoothing the pulse width modulated voltage outputted by the switching device 511 and includes a choke coil L and an output capacitor $C_{out}$. The voltage outputted by the smoothing circuit 512 is outputted as DC power supply voltage $V_{out}$ from the digitally controlled power supply apparatus 501, and applied to the load (not illustrated) connected to the digitally controlled power supply apparatus 501. The power supply voltage $V_{out}$ outputted by the digitally controlled power supply apparatus 501 is fed back to the digital control unit 531 for automatic adjustment of the DC voltage output. The analog-digital converter 513 analog-digital converts the power supply voltage outputted by the smoothing circuit 512 to output power supply voltage digital data. The power supply voltage digital data outputted by the analog-digital converter 513 is inputted to the digital control unit 531. The digital control unit 531 includes a PID (Proportional-Integral-Derivative) controller 514, which performs PID control operation to the error between the setpoint and the power supply voltage digital data outputted by the analog-digital converter 513, and a control parameter adjuster 516, which dynamically performs automatic adjustment of the control parameters (proportional gain, derivative gain, and integral gain) used for the PID control operation by the PID controller 514 based on the history of fluctuations indicated in samplings of the power supply voltage digital data. The switching drive circuit 515 generates gate signals for on/off driving the switching device 511 based on the operation outcome of the PID controller 514, and outputs the signals to the gates of the switching device 511.

Such a digitally controlled power supply apparatus 501 may encounter fluctuations of the power supply voltage $V_{out}$ outputted by the digitally controlled power supply apparatus 501 due to effects of various noises, aging of analog circuits inside, conditions of loads connected to the digitally controlled power supply apparatus 501 or other various factors. The control parameter adjuster 516 adjusts in real time the control parameters used for the PID control operation by the PID controller 514 and thereby ensures that the power supply voltage $V_{out}$ outputted by the digitally controlled power supply apparatus 501 remains a stable DC voltage output. For example, the voltage outputted by the smoothing circuit 512 (i.e., the power supply voltage $V_{out}$ outputted by the digitally controlled power supply apparatus 501) may more widely fluctuate as the capacitance of the output capacitor $C_{out}$ in the smoothing circuit 512 decreases because of the aging of the output capacitor, but the real time adjustment by the control parameter adjuster 516 of the control parameters used for the PID control operation by the PID controller 514 ensures that the power supply voltage $V_{out}$ outputted by the digitally controlled power supply apparatus 501 is kept substantially constant.

Various algorithms are known for automatic adjustment of the control parameters for PID controllers widely used for various control apparatuses including digitally controlled power supply apparatuses, such as the one described in Published Japanese Translation of PCT International Publication for Patent Application (Kohyo) No. 11-510932.

With various electric apparatuses equipped with a DC power supply, an abnormality in the DC power supply may bring various adverse effects on the apparatus and accompanying equipment; therefore, it is important to detect any malfunctions in the DC power supply.

For example, Japanese Unexamined Patent Publication (Kokai) No. 2-145977 describes a power supply monitor apparatus for detecting abnormalities of a DC power supply by monitoring errors between the output voltages of the DC power supply and the standard voltage as well as the ripple voltages of the DC power supply.

For example, Japanese Unexamined Patent Publication (Kokai) No. 2005-172653 describes an apparatus for monitoring the life of a power supply apparatus, exploiting the characteristics that the life of a power supply apparatus depends on the life of the electrolytic capacitor and that the ripple voltage of the output voltage of the power supply apparatus increases as the electrolytic capacitor approaches the end of its life.

For example, Japanese Unexamined Patent Publication (Kokai) No. 5-56629 describes a power conversion apparatus for industrial use that outputs maintenance information of the power conversion apparatus itself from the component deterioration detection circuit provided inside the power conversion apparatus and estimates the remaining lifespan of a component by comparing an estimation model for estimating the degree of deterioration (expected lifespan) with the operational conditions.

Further, in manufacturing plants, the machining and welding of workpieces (works) are carried out by using manufacturing machines such as a machine tool, an injection molding machine, or an arc welding robot. For machining workpieces, a plurality of manufacturing machines is grouped into manufacturing lines, e.g. manufacturing cells. In such a case, the manufacturing machines constituting the manufacturing cells are controlled by cell controllers via a communication network. The cell controllers are given an instruction of production plan by a production management apparatus placed on a still higher level. In such a production management system, there is an extensive demand for a power supply apparatus with high reliability and a capacity to supply stable DC voltage output as DC power supply for respective control systems of the manufacturing machines, the cell controllers, and the production management apparatus.

In a production management system having a cell controller that controls a plurality of manufacturing machines that constitute a manufacturing cell and a production management apparatus that gives an instruction of production plan to the cell controller, an abnormality in a single device may significantly impact the whole system and greatly decrease the productivity of the factory. This is especially relevant for power supply apparatuses because they are widely used as DC power supply for respective control systems of different pieces of equipment and an abnormality in a power supply apparatus directly leads to a malfunction in the control systems. To fully exploit the capacity of the digitally controlled power supply apparatus with an automatic adjustment function, which is a kind of power supply apparatus, for maintaining a stable DC output voltage, it is preferable to be able to detect the aging of the digitally controlled power supply apparatus to allow for an advance maintenance before an abnormality in the digitally controlled power supply apparatus occurs.

For example, Japanese Unexamined Patent Publication (Kokai) No. 2-145977 and Japanese Unexamined Patent Publication (Kokai) No. 2005-172653 describe techniques for detecting an abnormality in the power supply by monitoring physical property values such as output voltage or ripple voltage, but the techniques require a separate hardware circuit for monitoring the physical property values and therefore have a drawback of additional expenses. In addition, although power supply performance tends to deteriorate gradually, the techniques in Japanese Unexamined Patent Publication (Kokai) No. 2-145977 and Japanese Unexamined Patent Publication (Kokai) No. 2005-172653 detect an abnormality only when there is a change in output voltage or ripple voltage, which makes the techniques unsuitable for advance maintenance, since it is highly likely that the abnormality have already impacted the devices equipped with the power supply or the system as a whole at the time of the detection of an abnormality. Furthermore, an inappropriately selected threshold to be used for abnormality detection may lead to an excessively early detection of abnormality or to a delayed detection of abnormality, resulting in a failure of maintenance.

For example, a technique described in Japanese Unexamined Patent Publication (Kokai) No. 5-56629 also requires a provision of a separate hardware circuit for monitoring operational conditions and has a drawback of additional expenses. This is especially relevant in that the more in detail the operational conditions are to be monitored, the more hardware that needs to be added. Furthermore, since the expected lifespan is determined by using an estimation model, when an inaccurate estimation model is used, an abnormality will occur in the power supply before the end of the expected lifespan as determined, which may result in an abrupt failure in the operation of the equipment provided with the power supply or the system as a whole.

Published Japanese Translation of PCT International Publication for Patent Application (Kohyo) No. 11-510932 discloses an algorithm for automatically adjusting the control parameters for PID controllers, but does not disclose a technique for detecting an occurrence of abnormality in a digitally controlled power supply apparatus for advance maintenance.

The capacity of a digitally controlled power supply apparatus of maintaining a stable DC output voltage can be fully exploited if the maintenance operator is notified in advance that an abnormality is likely to occur in a near future in the digitally controlled power supply apparatus to allow for the time for maintenance of the digitally controlled power supply apparatus before the abnormality actually occurs. This is especially relevant in a production management system that includes manufacturing machines, cell controllers and a production management apparatus, where a malfunction in any of the digitally controlled power supply apparatuses mounted in the equipment would significantly impact the whole system and greatly reduce the productivity of the factory, and therefore a great importance is attached to the preventive maintenance (advance maintenance) of the digitally controlled power supply apparatuses.

SUMMARY OF INVENTION

Thus, there is a demand for a digitally controlled power supply apparatus at low cost with a capacity to make advance notification to prompt maintenance before occurrence of abnormality, and a production management system including such an apparatus.

In the first aspect of the present disclosure, a digitally controlled power supply apparatus includes: a switching device for converting a given input voltage to output a converted voltage by being on/off driven in accordance with gate signals that the switching device receives; a smoothing circuit for smoothing the converted voltage outputted by the switching device to output a power supply voltage; an analog-digital converter for analog-digital converting the power supply voltage outputted by the smoothing circuit to output a power supply voltage digital data; a PID controller for performing PID control operation to an error between a setpoint and the power supply voltage digital data outputted by the analog-digital converter; a switching drive circuit for generating gate signals for on/off driving the switching device, based on an operation outcome of the PID controller; a control parameter adjuster for dynamically performing automatic adjustment of control parameters used for the PID control operation by the PID controller, based on a history of fluctuations indicated in samplings of the power supply voltage digital data; and a control parameter output unit for outputting the control parameters used for the PID control operation by the PID controller.

In the second aspect of the present disclosure, the digitally controlled power supply apparatus further includes a control parameter determination unit for determining whether or not the control parameters outputted by the control parameter output unit satisfy an abnormality determination condition defined in advance, and an alarm output unit for outputting an advance maintenance alarm when the control parameter determination unit has determined that the abnormality determination condition is satisfied.

A production management system may include a cell controller mutually communicably connected with a manufacturing cell constituted by including a plurality of manufacturing machines equipped with a digitally controlled power supply apparatus according to the first aspect 1 for controlling the manufacturing machines, and a production management apparatus mutually communicably connected with the cell controller, for giving an instruction of production plan to the cell controller, wherein at least one of the manufacturing machines, the cell controller and the production management apparatus includes a control parameter determination unit for determining whether or not the control parameters outputted by the control parameter output unit satisfy an abnormality determination condition defined in advance and an alarm output unit for outputting an advance maintenance alarm when the control parameter determination unit has determined that the abnormality determination condition is satisfied.

Further, a production management system may include a cell controller equipped with a digitally controlled power supply apparatus according to the first aspect and mutually communicably connected with a plurality of manufacturing machines constituting a manufacturing cell, for controlling the manufacturing machines, and a production management apparatus mutually communicably connected with the cell controller, for giving an instruction of production plan to the cell controller, wherein the production management apparatus includes a control parameter determination unit for determining whether or not the control parameters outputted by the control parameter output unit satisfy an abnormality determination condition defined in advance and an alarm output unit for outputting an advance maintenance alarm when the control parameter determination unit has determined that the abnormality determination condition is satisfied.

Further, a production management system may include a cell controller mutually communicably connected with a plurality of manufacturing machines constituting a manufacturing cell, for controlling the manufacturing machines, and a production management apparatus mutually communicably connected with the cell controller, for giving an instruction of production plan to the cell controller, wherein at least one of the cell controller and the production management apparatus is equipped with a digitally controlled power supply apparatus according to the second aspect.

BRIEF DESCRIPTION OF THE DRAWINGS

The present invention will be understood more clearly by referring to the following accompanying drawings.

DETAILED DESCRIPTION

Figure 1:
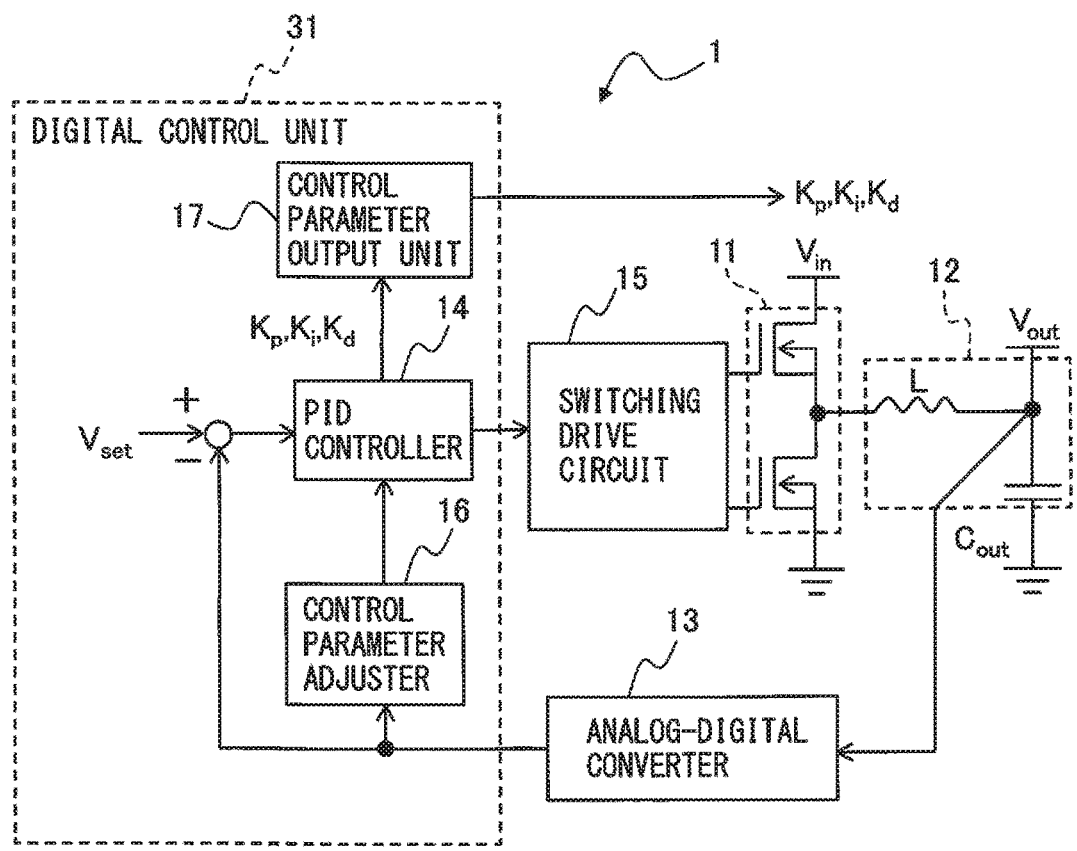
FIG. 1 is a block diagram of a digitally controlled power supply apparatus according to a first embodiment of the present disclosure.

Referring to the drawings, embodiments of the present disclosure will be described below. In the drawings, like components are denoted by like reference numerals. For the sake of easy understanding, the scales of the drawings are properly changed. The embodiments illustrated in the drawings are merely illustrative and the present invention is not limited to the embodiments illustrated in the drawings.

FIG. 1 is a block diagram of a digitally controlled power supply apparatus according to a first embodiment of the present disclosure. Hereinbelow, components denoted by like reference numerals are meant to be understood as components having like functions.

The digitally controlled power supply apparatus 1 according to the first embodiment of the present disclosure includes a switching device 11, a smoothing circuit 12, an analog-digital converter 13, a PID controller 14, a switching drive circuit 15, a control parameter adjuster 16, and a control parameter output unit 17. The PID controller 14, the control parameter adjuster 16, and the control parameter output unit 17 are disposed in the digital control unit 31. The digital control unit 31 is realized by, for example, an ASIC (Application Specific Integrated Circuit) or a microcontroller.

The switching device 11 is, for example, an FET (Field Effect Transistor) which, by being on/off driven in accordance with gate signals that it receives, converts a given input voltage $V_{in}$ to output a converted voltage (for example a pulse width modulated voltage).

The smoothing circuit 12 is for smoothing the converted voltage outputted by the switching device 11 to output a power supply voltage, and includes a choke coil L and an output capacitor $C_{out}$. The voltage outputted by the smoothing circuit 12 is outputted as DC power supply voltage $V_{out}$ from the digitally controlled power supply apparatus 1, and applied to the load (not illustrated) connected to the digitally controlled power supply apparatus 1. The power supply voltage $V_{out}$ outputted by the digitally controlled power supply apparatus 1 is fed back to the digital control unit 31 for automatic adjustment of the DC voltage output.

The analog-digital converter 13 analog-digital converts the power supply voltage outputted by the smoothing circuit 12 to output power supply voltage digital data. The power supply voltage digital data outputted by the analog-digital converter 13 is inputted to the digital control unit 31.

The control parameter adjuster 16 dynamically performs automatic adjustment of the control parameters used for the PID control operation by the PID controller 14 based on a history of fluctuations indicated in samplings of the power supply voltage digital data.

The PID controller 14 performs PID control operation to the error between the preselected setpoint and the power supply voltage digital data outputted by the analog-digital converter 13. The "preselected setpoint" is selected in such a manner as to allow the digitally controlled power supply apparatus 1 to output a power supply voltage $V_{out}$ that the digitally controlled power supply apparatus is expected to output as its function. The PID controller 14 performs PID control operation using the control parameters (proportional gain $K_p$, derivative gain $K_d$, integral gain $K_i$) adjusted by the control parameter adjuster 16.

The switching drive circuit 15 generates gate signals for on/off driving the switching device 11, based on the operation outcome of the PID controller 14, and outputs the signals to the gates of the switching device 11.

The control parameter output unit 17 outputs the control parameters used by the PID controller 14 for the PID control operation, i.e. proportional gain $K_p$, derivative gain $K_d$, and integral gain $K_i$.

Figure 2:
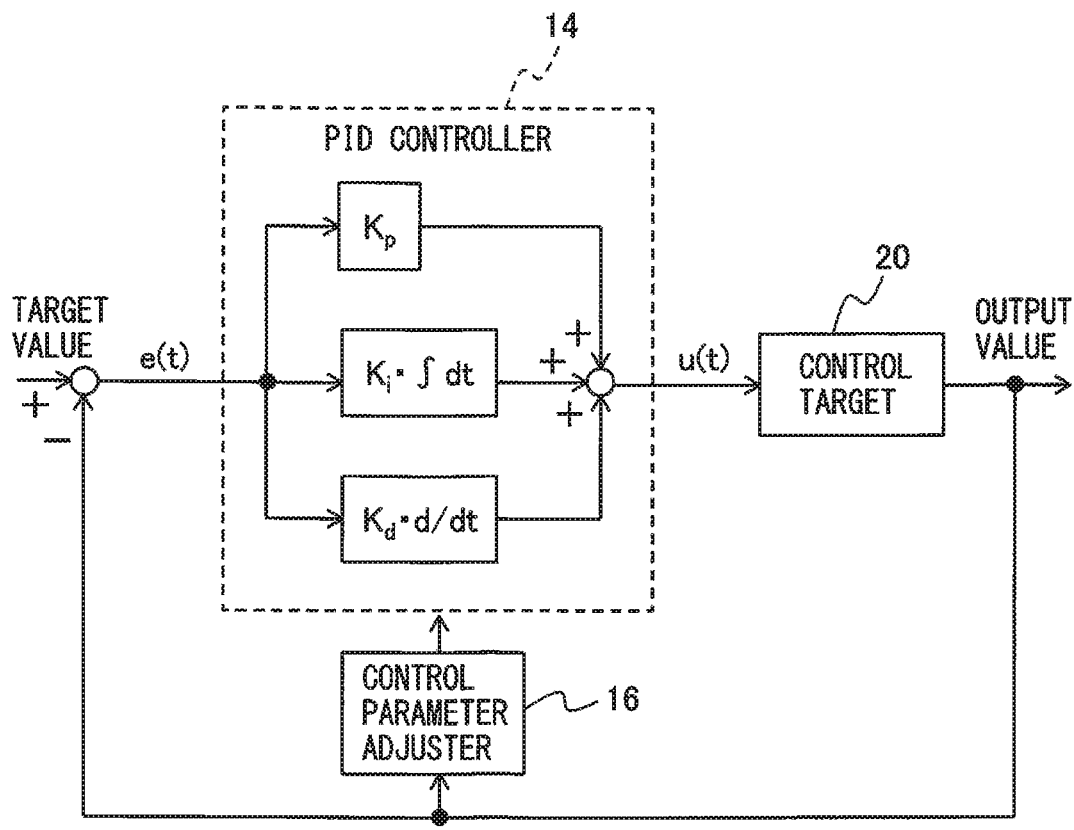
FIG. 2 is a block diagram illustrating the operation of a PID controller and a control parameter adjuster.

FIG. 2 is a block diagram illustrating the operations of the PID controller and the control parameter adjuster. The switching drive circuit 15, the switching device 11, the smoothing circuit 12, and the analog-digital converter 13 illustrated in FIG. 1 are collectively illustrated as a control target 20 in FIG. 2. The output value from the control target 20 is a voltage outputted from the smoothing circuit 12, i.e., a DC power supply voltage $V_{out}$ from the digitally controlled power supply apparatus 1. The "preselected setpoint" in FIG. 1 is referred to as the "target value" in FIG. 2, and the error between the target value and the output value is the input value e (t) to the PID controller 14. In accordance with the equation 1, the PID controller 14 outputs a manipulated variable u (t) for the input value e (t) by PID control operation. The proportional gain $K_p$, derivative gain $K_d$, and integral gain $K_i$ used in the operation are those adjusted and selected by the control parameter adjuster 16.

$$u(t) = K_p \cdot e(t) + K_i \cdot \int e(t)dt + K_d \cdot \frac{de(t)}{dt} \quad (1)$$

The control parameter adjuster 16 dynamically performs automatic adjustment of the control parameters used for the PID control operation by the PID controller 14, i.e. the proportional gain $K_p$, derivative gain $K_d$, and integral gain $K_i$, based on a history of fluctuations indicated in samplings of the power supply voltage digital data. The present aspect is not particularly limited by algorithms to be used for the adjustment of the control parameters by the control parameter adjuster 16, and may employ control parameter adjustment algorithms publicly known. The power supply voltage $V_{out}$ outputted by the digitally controlled power supply apparatus 1 may fluctuate due to effects of various noises, aging of analog circuits inside, conditions of loads connected to the digitally controlled power supply apparatus 1 or other various factors, but the control parameter adjuster 16 adjusts in real time the control parameters used for the PID control operation by the PID controller 14, i.e. proportional gain $K_p$, derivative gain $K_d$, and integral gain $K_i$ and thereby ensures that the power supply voltage $V_{out}$ outputted by the digitally controlled power supply apparatus 1 remains a stable DC voltage output.

The control parameters, i.e. proportional gain $K_p$, derivative gain $K_d$, and integral gain $K_i$, adjusted by the control parameter adjuster 16 and used for the PID control operation by the PID controller 14 are outputted by the control parameter output unit 17 to the outside.

In the present aspect, changes in control parameters outputted by the control parameter output unit 17 are monitored for detecting a likely occurrence of abnormality in the digitally controlled power supply apparatus 1 based on the monitored changes, and in the case where there is a likely occurrence of abnormality an advance maintenance alarm is outputted to notify the operator of the likely occurrence of abnormality.

In particular, in the first embodiment of the present disclosure, processes of detecting a likely occurrence of abnormality in the digitally controlled power supply apparatus 1 based on the changes in the control parameters and of outputting an alarm are performed by a device (not illustrated) external to the digitally controlled power supply apparatus 1. Accordingly, the external device is provided with a control parameter determination unit for determining whether or not the control parameters outputted by the control parameter output unit 17 satisfy an abnormality determination condition defined in advance, and an alarm output unit for outputting an advance maintenance alarm when the control parameter determination unit has determined that the abnormality determination condition is satisfied. An arithmetic processing unit included in the apparatus equipped with the digitally controlled power supply apparatus 1 may serve as this external device.

Figure 3:
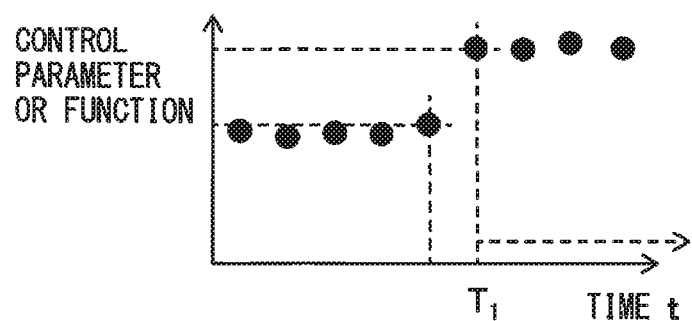
FIG. 3 illustrates a change in a control parameter for the PID controller in the digitally controlled power supply apparatus.

FIG. 3 illustrates a change in a control parameter for the PID controller provided in the digitally controlled power supply apparatus. The control parameter adjuster 16 appropriately adjusts the control parameters for the PID controller 14, i.e. proportional gain $K_p$, derivative gain $K_d$, integral gain $K_i$ even when there are various environment changes such as effects of various noises, aging of analog circuits inside, conditions of loads connected to the digitally controlled power supply apparatus 1; nonetheless, when there is a major deterioration that can cause malfunctioning in the future in, for example, an analog circuit, the control parameters adjusted by the PID controller 14 change significantly. Therefore, by constantly monitoring the control parameters adjusted by the PID controller 14, it can be judged that an abnormality (malfunctioning) may occur in a near future when there is a significant change in the control parameters, and an advance maintenance alarm is outputted at this stage as an advance notification to prompt the operator to undertake maintenance. In FIG. 3, for example, as the control parameter changes significantly at time $T_1$, it is judged at this stage that an abnormality (malfunctioning) may occur in a near future and an advance maintenance alarm is outputted as an advance notification to prompt the operator to undertake maintenance.

The control parameter to be monitored may be any one of proportional gain $K_p$, derivative gain $K_d$, and integral gain $K_i$ but, as various environmental changes are represented most conspicuously in the value of derivative gain $K_d$, derivative gain $K_d$ is preferably used for the abnormality determination process. Alternatively, a function $f(K_p, K_d, K_i)$ in equation 2 may be used, wherein proportional gain $K_p$, derivative gain $K_d$, and integral gain $K_i$ are weighted in a manner such that "a<b≤c" or "a<c≤b" holds.

$$f(K_p, K_i, K_d) = a \cdot K_p + b \cdot K_i + c \cdot K_d \quad (2)$$

The control parameter determination unit provided externally to the digitally controlled power supply apparatus 1 determines whether or not the control parameter outputted by the control parameter output unit 17 (or the weighted value of the function in equation 2) satisfies the abnormality determination condition defined in advance. Determination as to whether the abnormality determination condition is satisfied or not may be based on, for example, whether the selected control parameter (or the weighted value of the function in equation 2) exceeds a predetermined threshold (absolute value) or not. In this case, when the control parameter (or the weighted value of the function in equation 2) is determined to have exceeded the predetermined threshold (absolute value), it is determined that "the abnormality determination condition is satisfied". Alternatively, determination as to whether the abnormality determination condition is satisfied or not may be based on, for example, whether or not the relative rate of change of the control parameter (or the weighted value of the function in equation 2) exceeds a predetermined range. The rate of change may be calculated in intervals of an hour, day, month, or year. In this case, when the rate of change of the control parameter (or the weighted value of the function in equation 2) is determined to have exceeded the predetermined range (absolute value), it is determined that "the abnormality determination condition is satisfied". When the abnormality determination condition is determined to have been satisfied, the alarm output unit provided externally to the digitally controlled power supply apparatus 1 outputs an advance maintenance alarm. More preferably, the advance maintenance alarm may generate an indication on a display device, which may be one of various kinds, or a warning sound or buzzing sound from an audio device, which may be one of various kinds, which will allow the operator to learn easily that the digitally controlled power supply apparatus is due for maintenance before an actual occurrence of abnormality.

A second embodiment of the present disclosure will be described next. In the first embodiment described above, processes of detecting a likely occurrence of abnormality in the digitally controlled power supply apparatus 1 based on changes in the control parameters and of outputting an alarm are performed by a device external to the digitally controlled power supply apparatus whereas in the second embodiment of the present disclosure these processes are performed in a digital control unit inside the digitally controlled power supply apparatus.

Figure 4:
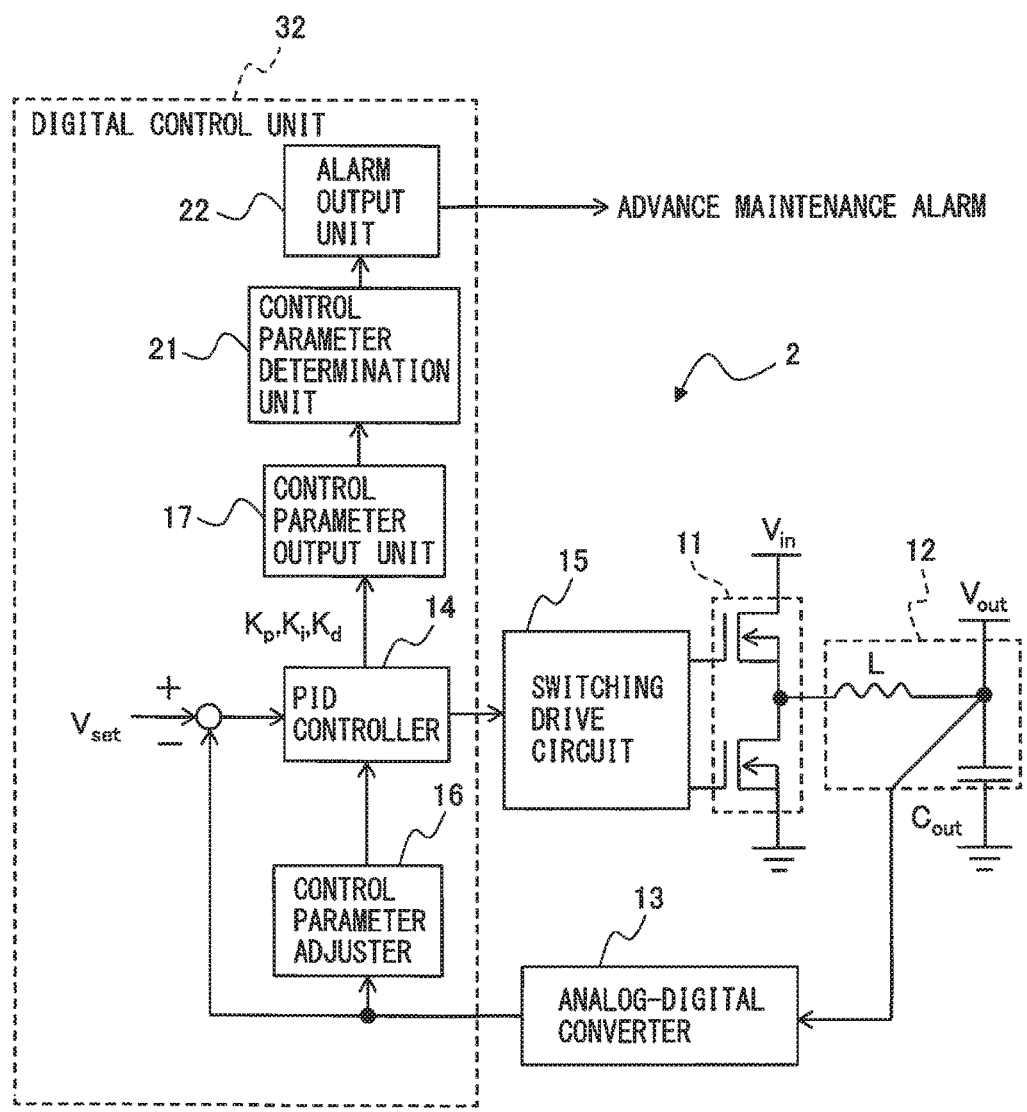
FIG. 4 is a block diagram of a digitally controlled power supply apparatus according to a second embodiment of the present disclosure.

FIG. 4 is a block diagram of a digitally controlled power supply apparatus according to the second embodiment of the present disclosure. The digitally controlled power supply apparatus 2 according to the second embodiment of the present disclosure includes a digital control unit 32 constituted by adding a control parameter determination unit 21 and an alarm output unit 22 to the digital control unit 31 in the digitally controlled power supply apparatus 1 according to the first embodiment as described with reference to FIGS. 1 to 3. The control parameter determination unit 21 determines whether or not the control parameters outputted by the control parameter output unit 17 satisfy the abnormality determination condition defined in advance. The alarm output unit 22 outputs an advance maintenance alarm when the control parameter determination unit 21 determines that the abnormality determination condition is satisfied. The processes in the control parameter determination unit 21 and the alarm output unit 22 are like what has been described as processes in a device external to the digitally controlled power supply apparatus 1 in the first embodiment above. More preferably, the advance maintenance alarm to be outputted by the alarm output unit 22 may trigger an indication on a display device, which may be one of various kinds, or a warning sound or buzzing sound from an audio device, which may be one of various kinds, which will allow the operator to learn easily that the digitally controlled power supply apparatus is due for maintenance before an actual occurrence of abnormality. Note that all circuit components except the control parameter determination unit 21 and the alarm output unit 22 are like the circuit components illustrated in FIG. 1 and accordingly the like circuit components are denoted by like reference numerals and will not be described further in detail.

Description will be made below as to a case in which the digitally controlled power supply apparatus 1 according to the first embodiment or the digitally controlled power supply apparatus 2 according to the second embodiment as described above is applied to a production management system that includes a cell controller mutually communicably connected with a plurality of manufacturing machines constituting a manufacturing cell, and a production management apparatus mutually communicably connected with the cell controller, for giving an instruction of production plan to the cell controller. The number of the manufacturing machines and the number of the cell controllers in the production management system illustrated in FIGS. 5 to 11 to be referred to below are only illustrative and may be larger or smaller than illustrated.

Examples of manufacturing machines include NC machine tools, injection molding machines, industrial robots for arc welding and the like, PLCs, conveyers, measuring devices, test apparatuses, pressing machines, press-fitting machines, printing machines, die-cast machines, food machines, packaging machines, welding machines, washing machines, coating machines, assembly apparatuses, mounting machines, wood working machines, sealing apparatuses, and cutting machines, but the type of manufacturing machines does not particularly limit the present aspect.

A manufacturing cell is a set of manufacturing machines in a flexible combination for manufacturing products. A manufacturing cell is constituted by a plurality of manufacturing machines or a plurality of kinds of manufacturing machines such as various kinds of machine tools or robots but the number of manufacturing machines in a manufacturing cell is not particularly limited. A manufacturing cell may be, for example, a manufacturing line in which a workpiece is machined step by step by a plurality of manufacturing machines into a final product. A manufacturing cell may also be, for example, a manufacturing line in which two or more workpieces (components) are respectively processed by two or more manufacturing machines and then assembled by another manufacturing machine in the course of the manufacturing process, to be finished as a final workpiece (manufactured product). Further, for example, two or more workpieces processed in two or more manufacturing cells may be assembled, to be finished as a final workpiece (manufactured product). The manufacturing cell is disposed in the factory in which the product is manufactured. In contrast, the cell controller may be disposed in the factory in which the manufacturing cell is disposed or may be disposed in a building different from the factory. For example, the cell controller may be disposed in a separate building on the premises of the factory in which the manufacturing cell is disposed.

A production management apparatus is provided on a higher level than the cell controller in the production management system. The production management apparatus is mutually communicably connected with the cell controller and gives an instruction of production plan to the cell controller. The production management apparatus is disposed, for example, in an office far from the factory. In such a case, the cell controller and the production management apparatus are mutually connected communicably through, for example, the Internet.

Figure 5:
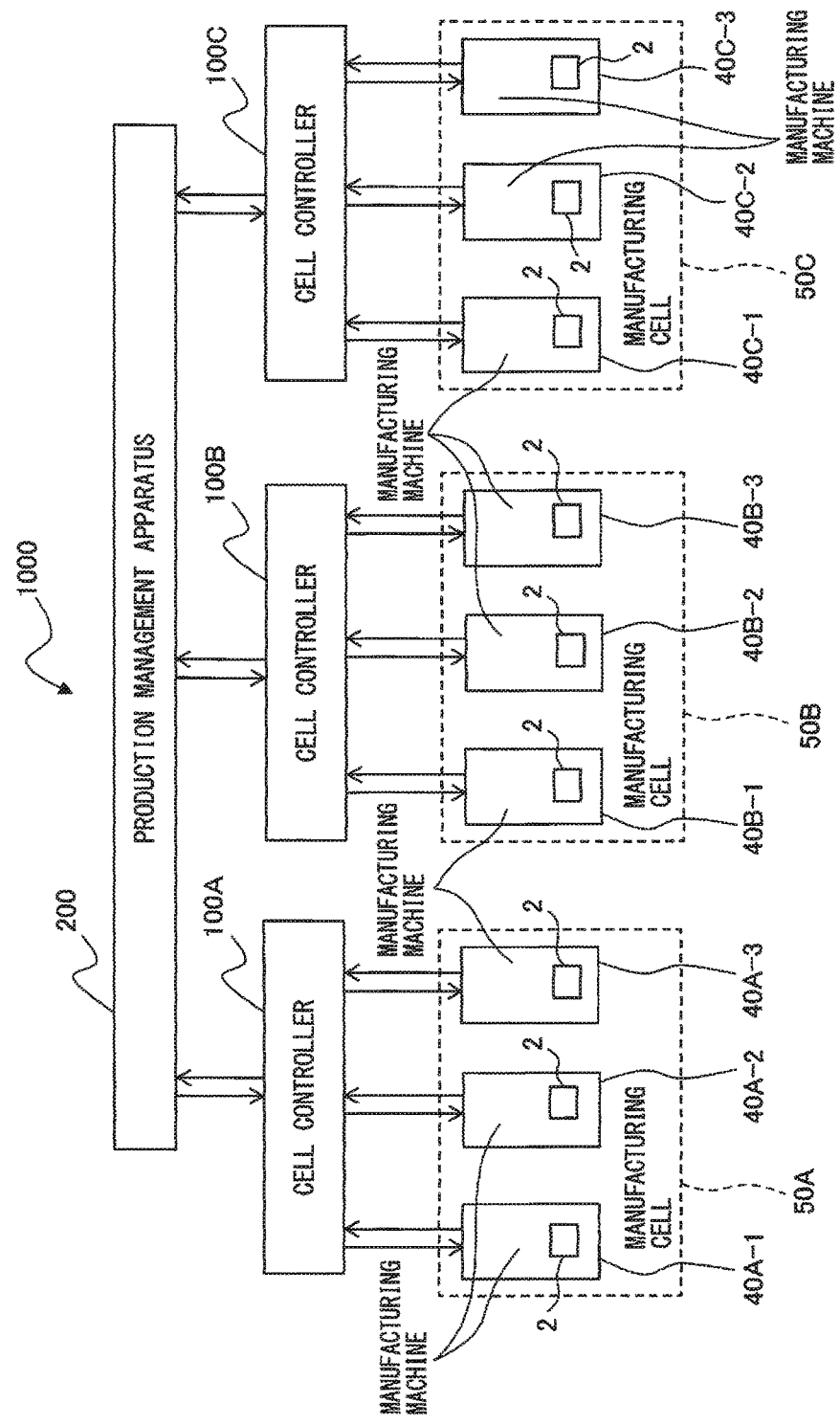
FIG. 5 is a block diagram of a production management system including digitally controlled power supply apparatuses according to the second embodiment as power supply for manufacturing machines.

FIG. 5 is a block diagram of a production management system including a digitally controlled power supply apparatuses according to the second embodiment as power supply for manufacturing machines. The production management system 1000 includes a plurality of manufacturing machines 40A-1 to 40A-3, 40B-1 to 40B-3, and 40C-1 to 40C-3, cell controllers 100A to 100C mutually communicably connected with the manufacturing machines 40A-1 to 40A-3, 40B-1 to 40B-3, and 40C-1 to 40C-3, respectively, for controlling the manufacturing machines, and a production management apparatus 200 mutually communicably connected with the cell controllers 100A to 100C, for giving an instruction of production plan to the cell controllers 100A to 100C.

The manufacturing machines 40A-1 to 40A-3, 40B-1 to 40B-3, and 40C-1 to 40C-3, constituting respective manufacturing cells 50A to 50C, each include a digitally controlled power supply apparatus 2 according to the second embodiment described with reference to FIG. 4. In the CPU (Central Processing Unit) or LSI (Large-Scale Integration) in each of the manufacturing machines 40A1 to 40A-3, 40B-1 to 40B-3, and 40C-1 to 40C-3, a digital control unit 32 of the digitally controlled power supply apparatus 2 is constituted. An advance maintenance alarm outputted from the alarm output unit 22 in the digitally controlled power supply apparatus 2 is sent to the production management apparatus 200 through one of the cell controllers 100A to 100C. The production management apparatus 200 causes a display device, which may be one of various kinds, to display an indication or causes an audio device, which may be one of various kinds, to generate a warning sound or buzzing sound, in response to the advance maintenance alarm that it has received. The operators working in the factory can easily learn that the digitally controlled power supply apparatus 2 is due for maintenance before an actual occurrence of abnormality. Further, the production management apparatus 200 may utilize the advance maintenance alarm that it has received, for preparation of a production plan.

Figure 6:
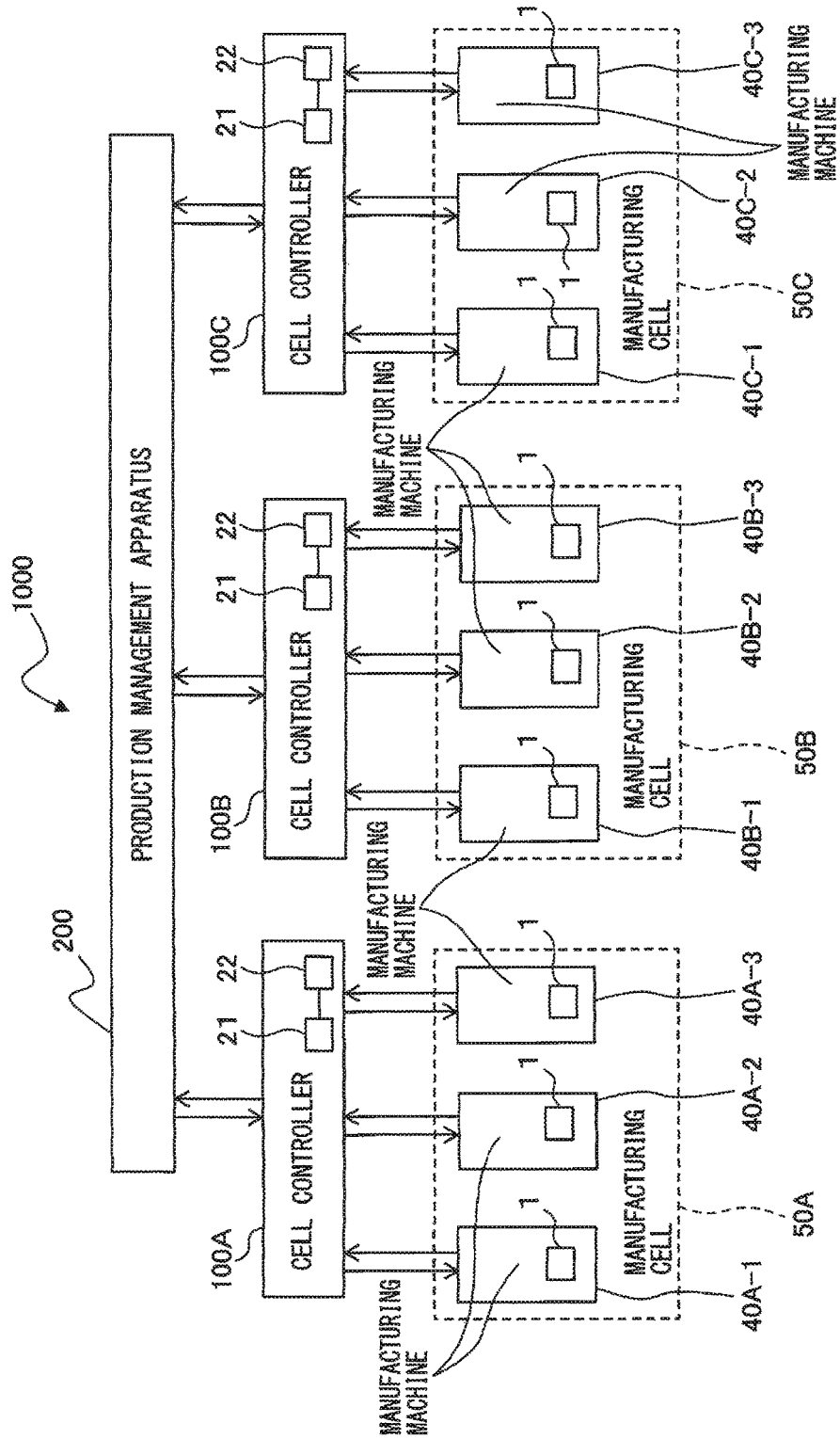
FIG. 6 is a (first) block diagram of a production management system including digitally controlled power supply apparatuses according to the first embodiment as power supply for manufacturing machines.
Figure 7:
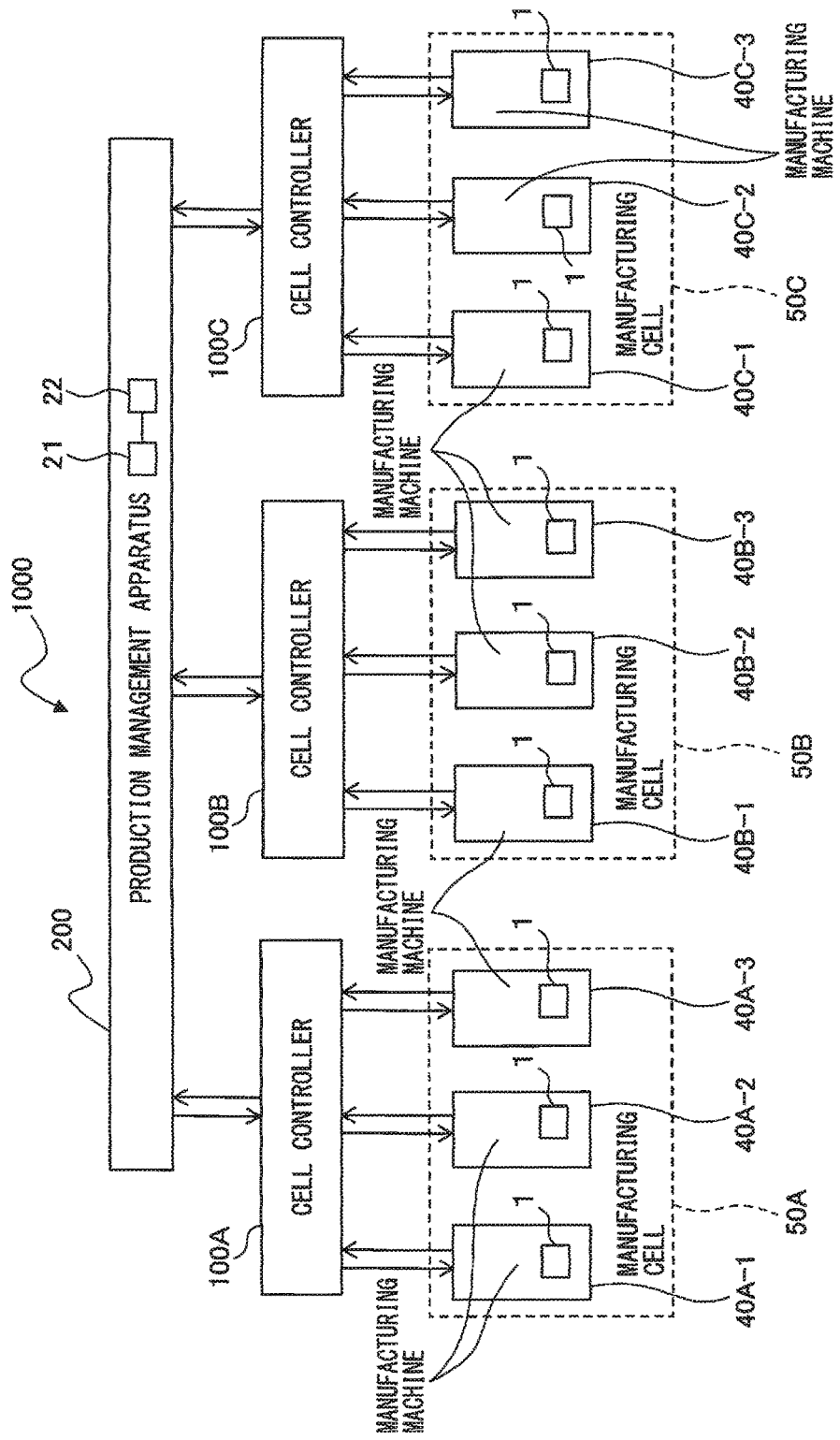
FIG. 7 is a (second) block diagram of a production management system including digitally controlled power supply apparatuses according to the first embodiment as power supply for manufacturing machines.

FIGS. 6 and 7 are block diagrams of a production management system including digitally controlled power supply apparatuses according to the first embodiment as power supply for manufacturing machines. In FIGS. 6 and 7, the plurality of manufacturing machines 40A-1 to 40A-3, 40B-1 to 40B-3, and 40C-1 to 40C-3 constituting respective manufacturing cells 50A to 50C each include a digitally controlled power supply apparatus 1 according to the first embodiment described with reference to FIGS. 1 to 3. In the CPU or LSI in each of the manufacturing machines 40A-1 to 40A-3, 40B-1 to 40B-3, and 40C-1 to 40C-3, a digital control unit 31 of the digitally controlled power supply apparatus 1 is constituted.

In the example illustrated in FIG. 6, in the CPU or LSI in each of the cell controllers 100A to 100C, a control parameter determination unit 21 and an alarm output unit 22 are provided. The control parameter determination unit 21 in each of the cell controllers 100A to 100C determines whether or not the control parameters outputted by the control parameter output units 17 of the manufacturing machines 40A-1 to 40A-3, 40B-1 to 40B-3, and 40C-1 to 40C-3 satisfy the abnormality determination condition defined in advance. The alarm output unit 22 outputs an advance maintenance alarm to the production management apparatus 200 when the control parameter determination unit 21 has determined that the abnormality determination condition is satisfied.

In the example illustrated in FIG. 7, in the CPU or LSI in the production management apparatus 200, a control parameter determination unit 21 and an alarm output unit 22 are provided. The control parameter determination unit 21 in the production management apparatus 200 determines whether or not the control parameters outputted by the control parameter output units 17 of the manufacturing machines 40A-1 to 40A-3, 40B-1 to 40B-3, and 40C-1 to 40C-3, which it has received through one of the cell controllers 100A to 100C, satisfy the abnormality determination condition defined in advance. The alarm output unit 22 outputs an advance maintenance alarm when the control parameter determination unit 21 has determined that the abnormality determination condition is satisfied.

In both examples illustrated in FIG. 6 and FIG. 7, the production management apparatus 200 causes a display device, which may be one of various kinds, to display an indication or causes an audio device, which may be one of various kinds, to generate a warning sound or buzzing sound, in response to the advance maintenance alarm. The operators working in the factory can easily learn that the digitally controlled power supply apparatus 1 is due for maintenance before an actual occurrence of abnormality. Further, the production management apparatus 200 may utilize the advance maintenance alarm that it has received, for preparation of a production plan.

Figure 8:
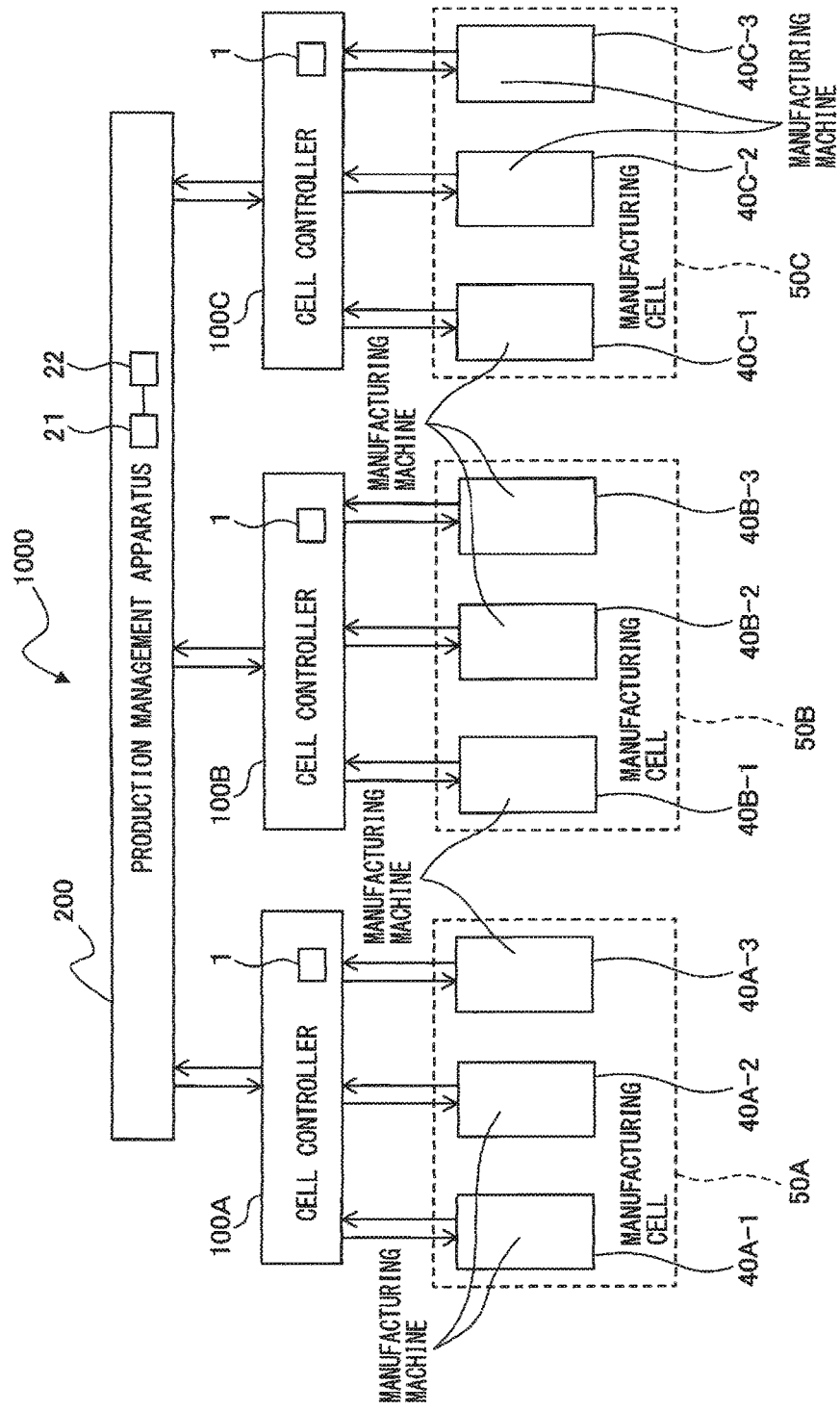
FIG. 8 is a block diagram of a production management system including digitally controlled power supply apparatuses according to the first embodiment as power supply for cell controllers.

FIG. 8 is a block diagram of a production management system including digitally controlled power supply apparatuses according to the first embodiment as power supply for cell controllers. The cell controllers 100A to 100C each include a digitally controlled power supply apparatus 1 according to the first embodiment described with reference to FIGS. 1 to 3. In the CPU or LSI in each of the cell controllers 100A to 100C, a digital control unit 31 of the digitally controlled power supply apparatus 1 is constituted. In the CPU or LSI in the production management apparatus 200, a control parameter determination unit 21 and an alarm output unit 22 are provided. The control parameter determination unit 21 in the production management apparatus 200 determines whether or not the control parameters outputted by the control parameter output units 17 of the cell controllers 100A to 100C satisfy the abnormality determination condition defined in advance. The alarm output unit 22 outputs an advance maintenance alarm when the control parameter determination unit 21 has determined that the abnormality determination condition is satisfied. The production management apparatus 200 causes a display device, which may be one of various kinds, to display an indication or causes an audio device, which may be one of various kinds, to generate a warning sound or buzzing sound, in response to the advance maintenance alarm. The operators working in the factory can easily learn that the digitally controlled power supply apparatus 1 is due for maintenance before an actual occurrence of abnormality. Further, the production management apparatus 200 may utilize the advance maintenance alarm that it has received, for preparation of a production plan.

Figure 9:
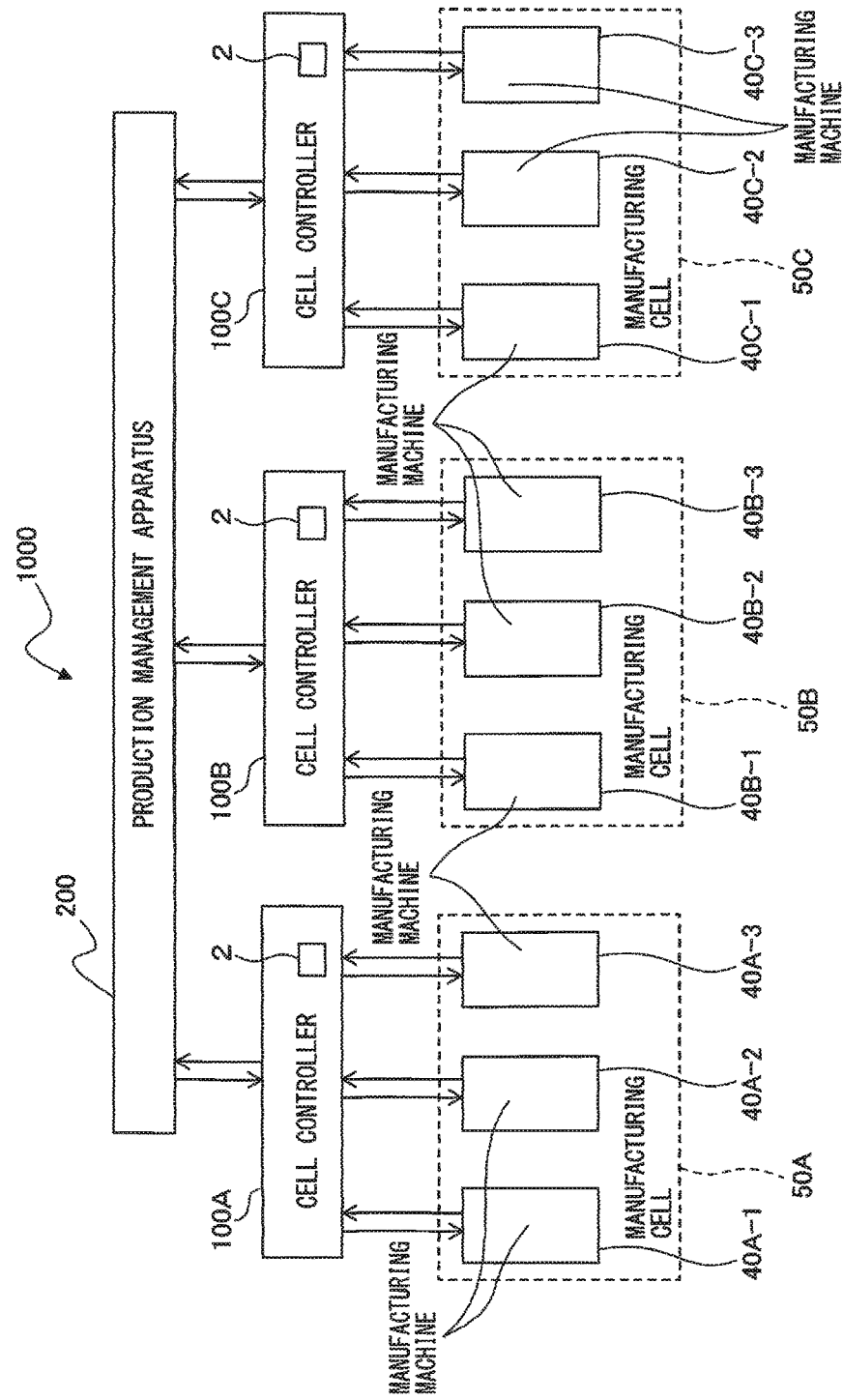
FIG. 9 is a block diagram of a production management system including digitally controlled power supply apparatuses according to the second embodiment as power supply for cell controllers.

FIG. 9 is a block diagram of a production management system including digitally controlled power supply apparatuses according to the second embodiment as power supply for cell controllers. The cell controllers 100A to 100C each include a digitally controlled power supply apparatus 2 according to the second embodiment described with reference to FIG. 4. In the CPU or LSI in each of the cell controllers 100A to 100C, a digital control unit 32 of the digitally controlled power supply apparatus 2 is constituted. An advance maintenance alarm outputted from the alarm output unit 22 in the digitally controlled power supply apparatus 2 is sent to the production management apparatus 200. The production management apparatus 200 causes a display device, which may be one of various kinds, to display an indication or causes an audio device, which may be one of various kinds, to generate a warning sound or buzzing sound, in response to the advance maintenance alarm that it has received. The operators working in the factory can easily learn that the digitally controlled power supply apparatus 2 is due for maintenance before an actual occurrence of abnormality. Further, the production management apparatus 200 may utilize the advance maintenance alarm that it has received, for preparation of a production plan.

Figure 10:
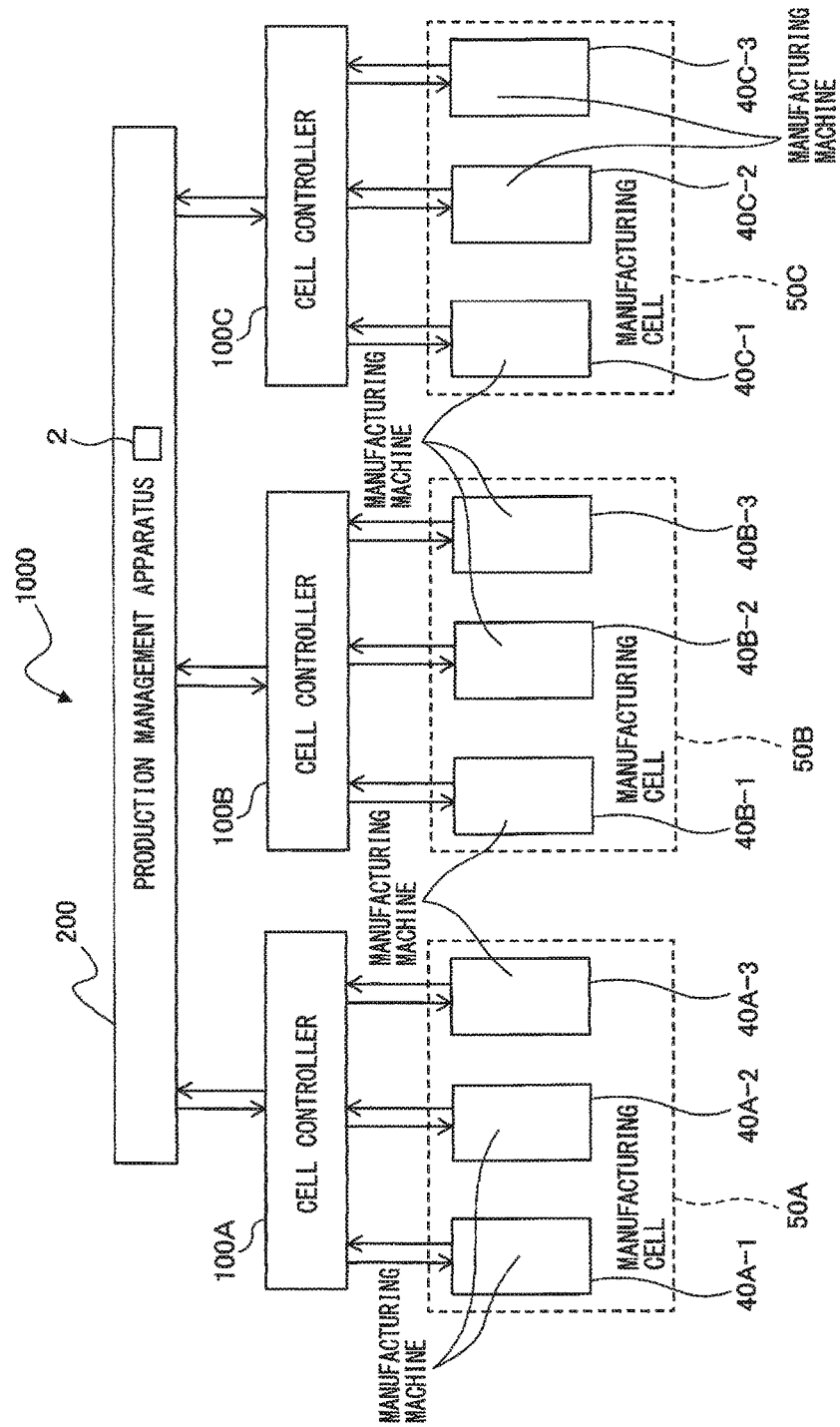
FIG. 10 is a block diagram of a production management system including a digitally controlled power supply apparatus according to the second embodiment as power supply for a production management apparatus.

FIG. 10 is a block diagram of a production management system including a digitally controlled power supply apparatus according to the second embodiment as power supply for a production management apparatus. The production management apparatus 200 includes a digitally controlled power supply apparatus 2 according to the second embodiment described with reference to FIG. 4. In the CPU or LSI in production management apparatus 200, a digital control unit 32 of the digitally controlled power supply apparatus 2 is constituted. The production management apparatus 200 causes a display device, which may be one of various kinds, to display an indication or causes an audio device, which may be one of various kinds, to generate a warning sound or buzzing sound, in response to the advance maintenance alarm outputted by the alarm output unit 22 in the digitally controlled power supply apparatus 2. The operators working in the factory can easily learn that the digitally controlled power supply apparatus 2 is due for maintenance before an actual occurrence of abnormality. Further, the production management apparatus 200 may utilize the advance maintenance alarm that it has received, for preparation of a production plan.

Figure 11:
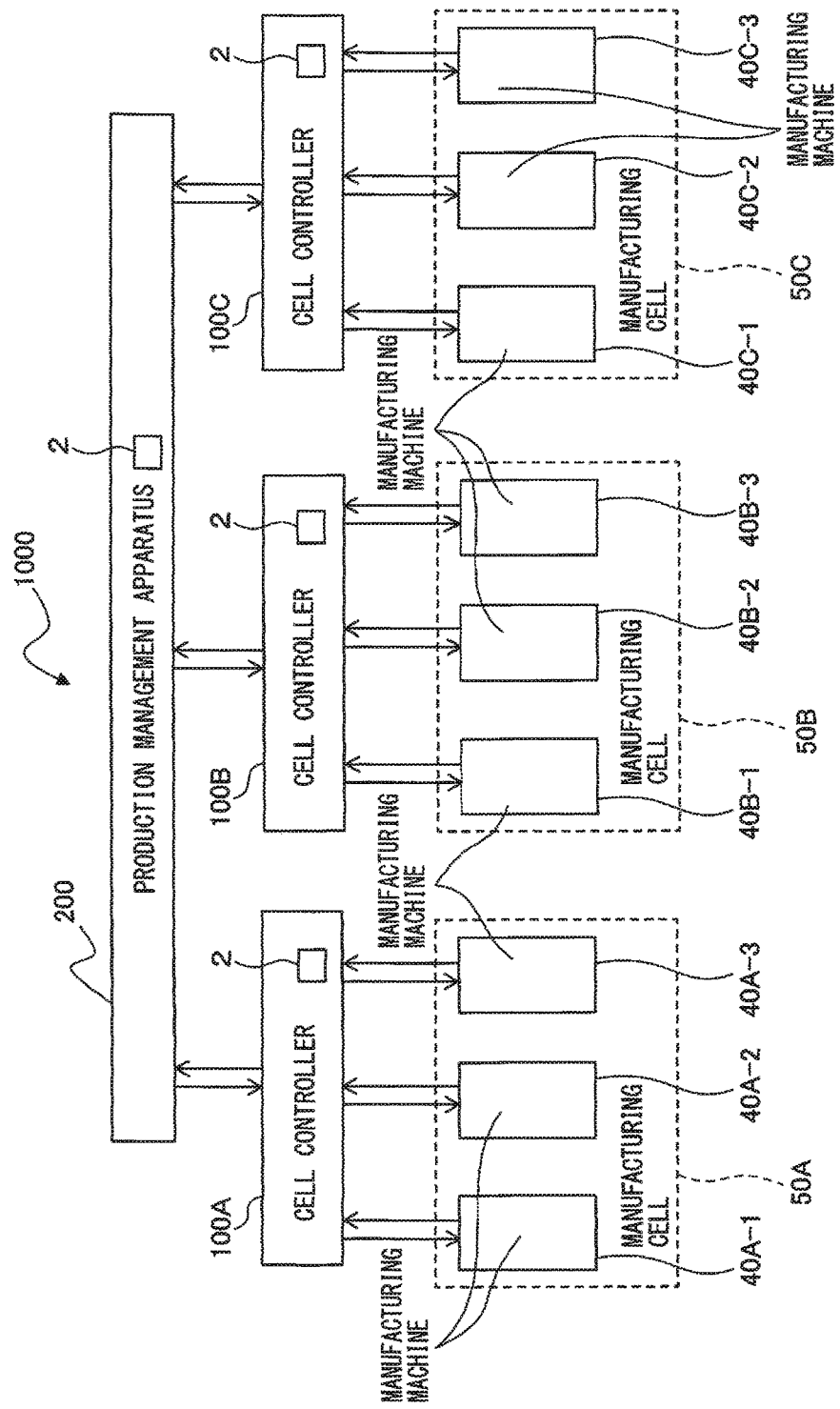
FIG. 11 is a block diagram of a production management system including digitally controlled power supply apparatuses according to the second embodiment as power supply for cell controllers and a production management apparatus.
Figure 12:
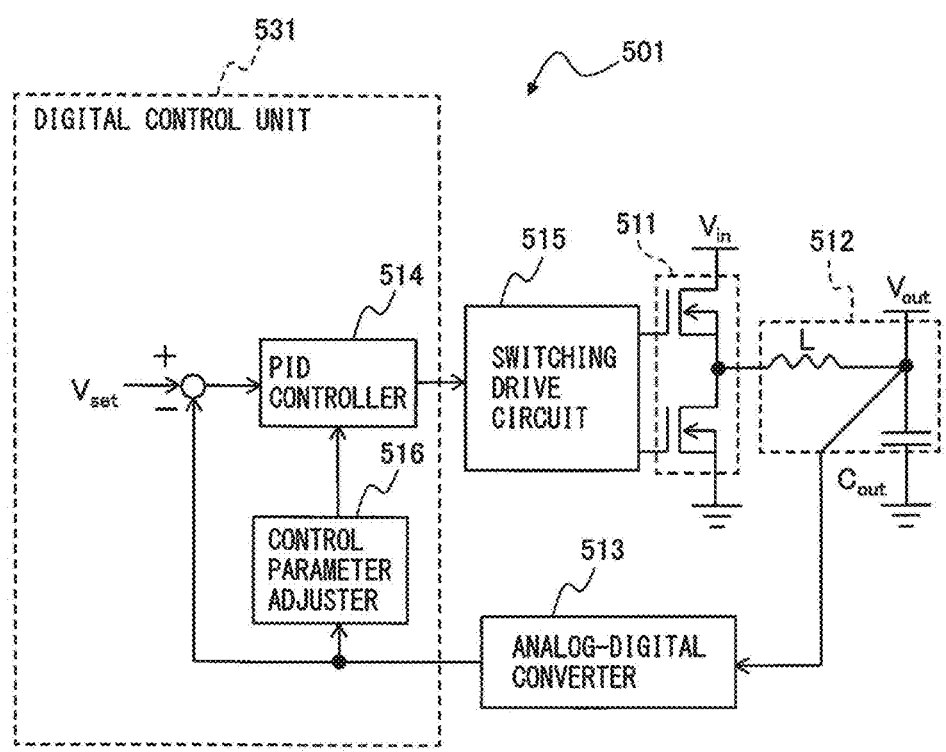
FIG. 12 illustrates a digitally controlled power supply apparatus with a common automatic adjustment function.

FIG. 11 is a block diagram of a production management system including digitally controlled power supply apparatuses according to the second embodiment as power supply for cell controllers and a production management apparatus. The cell controllers 100A to 100C and the production management apparatus 200 each include a digitally controlled power supply apparatus 2 according to the second embodiment described with reference to FIG. 4. In the CPU or LSI in each of the cell controllers 100A to 100C and the production management apparatus 200, a digital control unit 32 of the digitally controlled power supply apparatus 2 is constituted. An advance maintenance alarm outputted from the alarm output unit 22 in the digitally controlled power supply apparatus 2 in each of the cell controllers 100A to 100C is sent to the production management apparatus 200. The production management apparatus 200 causes a display device, which may be one of various kinds, to display an indication or causes an audio device, which may be one of various kinds, to generate a warning sound or buzzing sound, in response to the advance maintenance alarm that it has received from one of the cell controller 100A to 100C or that has been outputted by the production management apparatus 200 itself. The operators working in the factory can easily learn that the digitally controlled power supply apparatus 2 is due for maintenance before an actual occurrence of abnormality. Further, the production management apparatus 200 may utilize the advance maintenance alarm that it has received, for preparation of a production plan. Note that, in a further modification of FIG. 11, the manufacturing machines 40A-1 to 40A-3, 40B-1 to 40B-3, and 40C-1 to 40C-3 may each include a digitally controlled power supply apparatus 2 according to the second embodiment described with reference to FIG. 4, and in this case, as described with reference to FIG. 5, advance maintenance alarms outputted by the manufacturing machines 40A-1 to 40A-3, 40B-1 to 40B-3, and 40C-1 to 40C-3 are sent to the production management apparatus 200 through cell controllers 100A to 100C.

Hereinabove, with reference to FIGS. 5 to 11, examples have been described in which the above-described digitally controlled power supply apparatus 1 according to the first embodiment or digitally controlled power supply apparatus 2 according to the second embodiment is applied to the production management system, and, in addition to the illustrated examples, the digitally controlled power supply apparatus 1 according to the first embodiment and the digitally controlled power supply apparatus 2 according to the second embodiment may be used in any combination as appropriate as power supply for the manufacturing machines 40A-1 to 40A-3, 40B-1 to 40B-3, and 40C-1 to 40C-3, the cell controllers 100A to 100C, and the production management apparatus 200.

According to an aspect of the present disclosure, a digitally controlled power supply apparatus at low cost with a capacity to make advance notification without fail to prompt maintenance before an occurrence of abnormality and a production management system including such an apparatus are achieved.

According to an aspect of the present disclosure, by monitoring changes in the control parameters (proportional gain, derivative gain, and integral gain) for a PID controller provided in a digitally controlled power supply apparatus having an automatic adjustment function for stable DC voltage output, likely occurrences of abnormality in the digitally controlled power supply apparatus are detected based on the changes, and, when an occurrence of abnormality is predicted, an advance maintenance alarm is outputted to notify the operator of the likely occurrence of an abnormality, which ensures without fail the time for maintenance of the digitally controlled power supply apparatus before the abnormality actually occurs in the digitally controlled power supply apparatus, and allows the capacity of the digitally controlled power supply apparatus of maintaining a stable DC output voltage to be exploited until just before the maintenance. In addition, occurrences of abnormality are predicted based on changes in the control parameters (proportional gain, derivative gain, and integral gain) for the PID controller, hence with no additional hardware, and at low cost.

What is claimed is:

1. A digitally controlled power supply apparatus, comprising:
   a switching device for converting a given input voltage to output a converted voltage by being on/off driven in accordance with gate signals that the switching device receives;
   a smoothing circuit for smoothing the converted voltage outputted by the switching device to output a power supply voltage;
   an analog-digital converter for analog-digital converting the power supply voltage outputted by the smoothing circuit to output a power supply voltage digital data;
   a Proportional-Integral-Derivative (PID) controller for performing PID control operation to an error between a setpoint and the power supply voltage digital data outputted by the analog-digital converter;
   a switching drive circuit for generating gate signals for on/off driving the switching device, based on an operation outcome of the PID controller;
   a control parameter adjuster for dynamically performing automatic adjustment of control parameters used for the PID control operation by the PID controller, based on a history of fluctuations indicated in samplings of the
power supply voltage digital data;
a control parameter output unit for outputting the control
parameters adjusted by the control parameter adjuster
and used for the PID control operation by the PID
controller; and
a control parameter determination unit for determining
whether or not the control parameters outputted by the
control parameter output unit satisfy a predetermined
abnormality determination condition,
wherein the abnormality determination condition is based
on a rate of change of at least one of the control
parameters.

2. The digitally controlled power supply apparatus
according to claim 1, further comprising an alarm output
unit for outputting a maintenance alarm when the control
parameter determination unit has determined that the abnormality determination condition is satisfied.

3. A production management system, comprising:
a cell controller mutually communicably connected with
a manufacturing cell including a plurality of manufacturing machines for controlling the manufacturing
machines,
each of the plurality of manufacturing machines being
equipped with a digitally controlled power supply
apparatus comprising:
a switching device for converting a given input
voltage to output a converted voltage by being
on/off driven in accordance with gate signals that
the switching device receives;
a smoothing circuit for smoothing the converted
voltage outputted by the switching device to output a power supply voltage;
an analog-digital converter for analog-digital converting the power supply voltage outputted by the
smoothing circuit to output a power supply voltage digital data;
a Proportional-Integral-Derivative (PID) controller
for performing PID control operation to an error
between a setpoint and the power supply voltage
digital data outputted by the analog-digital converter;
a switching drive circuit for generating gate signals
for on/off driving the switching device, based on
an operation outcome of the PID controller;
a control parameter adjuster for dynamically performing automatic adjustment of control parameters used for the PID control operation by the PID
controller, based on a history of fluctuations indicated in samplings of the power supply voltage
digital data; and
a control parameter output unit for outputting the
control parameters adjusted by the control parameter adjuster and used for the PID control operation by the PID controller; and
a production management apparatus mutually communicably connected with the cell controller, for giving an
instruction of a production plan to the cell controller;
wherein at least one of the manufacturing machines, the
cell controller and the production management apparatus comprises:
a control parameter determination unit for determining
whether or not the control parameters outputted by
the control parameter output unit satisfy an abnormality determination condition; and
an alarm output unit for outputting a maintenance alarm
when the control parameter determination unit has
determined that the predetermined abnormality
determination condition is satisfied, and
wherein the abnormality determination condition is based
on a rate of change of at least one of the control
parameters.

4. A production management system, comprising:
a cell controller equipped with a digitally controlled
power supply apparatus and mutually communicably
connected with a plurality of manufacturing machines
constituting a manufacturing cell, for controlling the
manufacturing machines,
the digitally controlled power supply apparatus comprising:
a switching device for converting a given input
voltage to output a converted voltage by being
on/off driven in accordance with gate signals that
the switching device receives;
a smoothing circuit for smoothing the converted
voltage outputted by the switching device to output a power supply voltage;
an analog-digital converter for analog-digital converting the power supply voltage outputted by the
smoothing circuit to output a power supply voltage digital data;
a Proportional-Integral-Derivative (PID) controller
for performing PID control operation to an error
between a setpoint and the power supply voltage
digital data outputted by the analog-digital converter;
a switching drive circuit for generating gate signals
for on/off driving the switching device, based on
an operation outcome of the PID controller;
a control parameter adjuster for dynamically performing automatic adjustment of control parameters used for the PID control operation by the PID
controller, based on a history of fluctuations indicated in samplings of the power supply voltage
digital data; and
a control parameter output unit for outputting the
control parameters adjusted by the control parameter adjuster and used for the PID control operation by the PID controller; and
a production management apparatus mutually communicably connected with the cell controller, for giving an
instruction of a production plan to the cell controller;
wherein the production management apparatus comprises:
a control parameter determination unit for determining
whether or not the control parameters outputted by
the control parameter output unit satisfy a predetermined abnormality determination condition; and
an alarm output unit for outputting a maintenance alarm
when the control parameter determination unit has
determined that the abnormality determination condition is satisfied, and
wherein the abnormality determination condition is based
on a rate of change of at least one of the control
parameters.

5. A production management system, comprising:
a cell controller mutually communicably connected with
a plurality of manufacturing machines constituting a
manufacturing cell, for controlling the manufacturing
machines; and
a production management apparatus mutually communicably connected with the cell controller, for giving an
instruction of a production plan to the cell controller;

wherein at least one of the cell controller and the production management apparatus is equipped with a digitally controlled power supply apparatus comprising:
- a switching device for converting a given input voltage to output a converted voltage by being on/off driven in accordance with gate signals that the switching device receives;
- a smoothing circuit for smoothing the converted voltage outputted by the switching device to output a power supply voltage;
- an analog-digital converter for analog-digital converting the power supply voltage outputted by the smoothing circuit to output a power supply voltage digital data;
- a Proportional-Integral-Derivative (PID) controller for performing PID control operation to an error between a setpoint and the power supply voltage digital data outputted by the analog-digital converter;
- a switching drive circuit for generating gate signals for on/off driving the switching device, based on an operation outcome of the PID controller;
- a control parameter adjuster for dynamically performing automatic adjustment of control parameters used for the PID control operation by the PID controller, based on a history of fluctuations indicated in samplings of the power supply voltage digital data;
- a control parameter output unit for outputting the control parameters adjusted by the control parameter adjuster and used for the PID control operation by the PID controller;
- a control parameter determination unit for determining whether or not the control parameters outputted by the control parameter output unit satisfy a predetermined abnormality determination condition; and
- an alarm output unit for outputting a maintenance alarm when the control parameter determination unit has determined that the abnormality determination condition is satisfied,
wherein the abnormality determination condition is based on a rate of change of at least one of the control parameters.

* * * * *